United States Patent
Finimundi et al.

(10) Patent No.: US 10,958,777 B1
(45) Date of Patent: *Mar. 23, 2021

(54) METHODS AND SYSTEMS FOR STOWED STATE VERIFICATION IN AN ELECTRONIC DEVICE

(71) Applicant: Motorola Mobility LLC, Chicago, IL (US)

(72) Inventors: Daniel Spiewak Rempel Finimundi, Campinas (BR); Alexandre Neves Creto, Campinas (BR); Mauricio Dias Moises, Campinas (BR)

(73) Assignee: Motorola Mobility LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/003,677

(22) Filed: Aug. 26, 2020

Related U.S. Application Data

(63) Continuation of application No. 16/737,649, filed on Jan. 8, 2020, now Pat. No. 10,771,616.

(51) Int. Cl.
*H04M 1/00* (2006.01)
*H04M 1/725* (2021.01)

(52) U.S. Cl.
CPC .... *H04M 1/72569* (2013.01); *H04M 2250/12* (2013.01)

(58) Field of Classification Search
CPC ........ H04M 1/72569; H04M 1/72577; H04M 1/72583; H04M 2250/10; H04M 2250/12; H04M 2250/22; H04W 4/027; H04W 4/029; H04W 4/38; H04B 17/27
See application file for complete search history.

(56) References Cited

U.S. PATENT DOCUMENTS

| | | | |
|---|---|---|---|
| 8,803,701 B2* | 8/2014 | Koppal | H04M 1/0237 455/556.1 |
| 9,191,473 B2 | 11/2015 | Shimada | |
| 9,229,489 B2* | 1/2016 | Toksvig | H04W 52/0258 |

(Continued)

FOREIGN PATENT DOCUMENTS

WO 2013/126276 8/2013

OTHER PUBLICATIONS

"Moto Actions—Support", Motorola Support page viewed online Oct. 17, 2019 at https://support.motorola.com/in/en/solution/MS108582.

(Continued)

*Primary Examiner* — Quochien B Vuong
(74) *Attorney, Agent, or Firm* — Philip H. Burrus, IV

(57) ABSTRACT

An electronic device includes one or more processors. When a first sensor delivers a first signal to the one or more processors indicating that the electronic device is in a stowed state, and a second sensor delivers a second signal to the one or more processors indicating that the electronic device is in a held state the one or more processors query the third sensor for a third signal indicating whether the electronic device is in the stowed state. The one or more processors perform a control operation when the third signal fails to indicate the electronic device is in the stowed state. The one or more processors omit performance of the control operation when the third signal indicates the electronic device is in the stowed state.

20 Claims, 6 Drawing Sheets

(56) References Cited

U.S. PATENT DOCUMENTS

| | | |
|---|---|---|
| 9,462,379 B2 | 10/2016 | Ivanov et al. |
| 9,661,135 B1 | 5/2017 | Burns |
| 9,715,283 B2 | 7/2017 | Elkins et al. |
| 9,797,770 B2 | 10/2017 | Debates et al. |
| 9,813,864 B2 | 11/2017 | Dvortsov et al. |
| 9,971,059 B2 | 5/2018 | Debates et al. |
| 9,976,841 B2 | 5/2018 | McCarthy et al. |
| 10,136,271 B2 * | 11/2018 | DeLoy .............. H04M 3/42153 |
| 10,375,226 B2 | 8/2019 | Tanabe et al. |
| 10,420,031 B2 | 9/2019 | Alameh et al. |
| 10,551,195 B2 | 2/2020 | Lemarchand |
| 2016/0309413 A1 | 10/2016 | De Sabatino |
| 2017/0052613 A1 | 2/2017 | Alameh |

OTHER PUBLICATIONS

Vuong, Quochien, "Notice of Allowance", U.S. Appl. No. 16/737,649, filed Jan. 8, 2020; dated Jul. 9, 2020.

\* cited by examiner

METHODS AND SYSTEMS FOR STOWED STATE VERIFICATION IN AN ELECTRONIC DEVICE

CROSS REFERENCE TO PRIOR APPLICATIONS

This application is a continuation application claiming priority and benefit under 35 U.S.C. § 120 from U.S. application Ser. No. 16/737,649, filed Jan. 8, 2020, which is incorporated by reference for all purposes.

BACKGROUND

Technical Field

This disclosure relates generally to electronic devices, and more particularly to electronic devices with sensors.

Background Art

Portable electronic communication devices, such as smartphones and tablet computers, are becoming ubiquitous in society. As the technology employed by these devices has advanced, so too have their user interfaces. Instead of physical keypads, today touch sensitive displays are now the norm. Many electronic devices are equipped with voice recognition that allows a user to speak commands to a device instead of typing them. Some devices detect motion and gestures as well. These mechanisms can simplify user interaction with such devices, but may not be useful when conditions about the device prevent sensors from operating properly. It would be advantageous to have improved devices and methods where user interfaces function properly in an increased number of environments, settings, and conditions.

Figure 1:
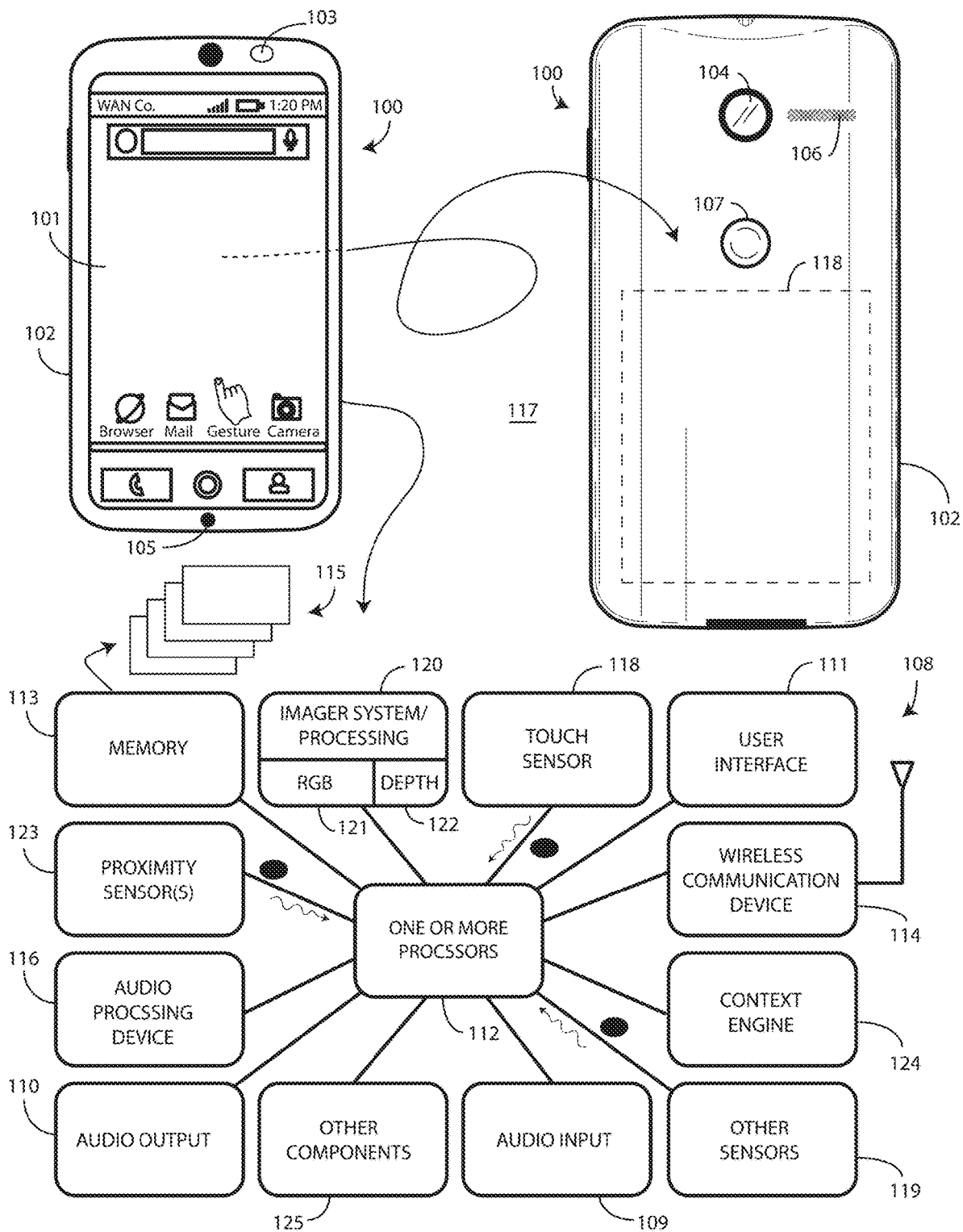
FIG. 1 illustrates one explanatory electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to receiving user input requesting performance of a control operation, determining whether an electronic device is in a held state or a stowed state, and performing the control operation only when the electronic device is in the held state. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of verifying whether an electronic device is in a stowed state, or alternatively is in a held state, after one or more proximity sensors provide an indication that the electronic device is in a stowed state described herein. The non-processor circuits may include, but are not limited to, a radio receiver, a radio transmitter, signal drivers, clock circuits, power source circuits, and user input devices. As such, these functions may be interpreted as steps of a method to perform performance of control operations in response to user input requesting the same only when a second sensor and a third sensor confirm that the electronic device is in a held state. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within ten percent, in another embodiment within five percent, in another embodiment within one percent and in another embodiment within 0.5 percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an electronic device configured to detect one or more gestures as user inputs at a user interface. For example, in one embodiment the electronic device includes one or more motion sensors that detect a lifting gesture. In one or more embodiments, the lifting gesture defines a predefined user input requesting the performance of one or more control operations, such as transitioning the electronic device from a normal mode of operation to a privacy mode of operation as one example. When the electronic device, using one or more sensors, detects the gesture, one or more processors of the electronic device can perform the one or more control operations in response. Advantageously, this use of gesture input provides a natural, immediate, and intuitive method of controlling the electronic device without the necessity of delivering voice commands or touch input to the user interface of the electronic device. With an electronic device configured in accordance with embodiments of the disclosure, a user can trigger, activate, actuate, or initiate control functions and perform control operations via simple gesture motions.

In one or more embodiments, electronic devices that include this functionality are configured not to perform these control operations when in a stowed state. Illustrating by example, if the electronic device is in a pocket and a lift motion occurs (perhaps when the person is on a carnival ride for instance), in one or more embodiments the electronic device precludes the execution of a control operation despite the fact that a predefined "gesture" has been detected. If a particular gesture causes actuation of a camera, for example, it may be undesirable to actuate the camera while the electronic device is in a pocket or purse, as doing so may deplete the battery of the electronic device or inadvertently capture unrecognizable pictures that unnecessarily consume memory. Accordingly, in one or more embodiments the one or more processors preclude the performance of a control operation in response to gesture input even when one or more sensors may indicate that the electronic device is in a stowed state.

While the electronic device can include many different sensors, in one or more embodiments one or more proximity sensors are primarily designated to determine whether the electronic device is in a stowed state. One or more processors of the electronic device can be operable to determine, for example, that the electronic device is in the stowed state of being in a pocket by determining whether an object, such as clothing, textile materials, or other natural, synthetic, or blend layer is covering the electronic device at the one or more proximity sensors. This determination can be made when the one or more processors receive signals from the one or more proximity sensors indicating that an object, such as a textile material, is less than a predefined distance from a surface of the electronic device, thereby indicating that the object is covering the electronic device. Where this occurs, the one or more processors can conclude that the electronic device is disposed within a pocket or is otherwise stowed. This detection of an object covering the electronic device can also serve as a confirmation that the electronic device is not being touched as well.

Embodiments of the disclosure contemplate that when a proximity sensor, be it a proximity detector component, proximity sensor component, or other form of proximity sensor, is primarily charged with determining whether the electronic device is in a stowed state, this situation can give rise to false detection situations in which the proximity sensor indicates that the electronic device is in a stowed state despite the fact that this is not true. If, for example, a person has their hand or finger directly atop the proximity sensor, the proximity sensor may deliver signals comprising an indication that the electronic device is in a stowed state despite the fact that it is actually in the user's hand. Similarly, if housing or fascia of the electronic device collocated with the proximity sensor is covered in debris or is otherwise obscured, the proximity sensor may indicate that the electronic device is in a stowed state even when it is not.

Some people like to put stickers on their electronic devices. Sticker placement atop a proximity sensor can cause the proximity sensor may indicate that the electronic device is in a stowed state even when it is not. Failure or compromised performance of the proximity sensor can also cause an indication of a stowed state when the electronic device is not stowed. When such failures or compromised performance becomes extended or permanent, gesture control can effectively be disabled.

Advantageously, embodiments of the disclosure provide methods and systems of verifying whether an electronic device is in a stowed state or held state when one or more proximity sensors indicate that the electronic device is in the stowed state. In one or more embodiments, one or more processors initially receive, from at least one proximity sensor, an indication that the electronic device is in a stowed state. When this occurs, in one or more embodiments the one or more processors determine with one or more sensors of the electronic device (other than the proximity sensor) whether the one or more sensors indicate that the electronic device is in a held state. Where this occurs, i.e., in response to the one or more sensors indicating that the electronic device is in a held state, the one or more processors determine with one or more other sensors whether the one or more other sensors indicate that the electronic device is in the stowed state.

In one or more embodiments, the one or more processors perform a control operation in response to gesture input when the one or more other sensors fail to indicate that the electronic device is in the stowed state. However, in one or more embodiments the one or more processors omit performance of the control operation when the one or more other sensors indicate that the electronic device is in the stowed state.

Illustrating by example, in one embodiment when a user input, such as a gesture, is received at a user interface and requests performance of a control operation, one or more processors of the electronic device query at least one proximity sensor to determine whether the electronic device is in a stowed state. In one or more embodiments, the one or more processors are configured to ignore the gesture input when the electronic device is in the stowed state, but perform one or more control operations in response to the gesture input when the electronic device is not in a stowed state. This prevents unwanted gesture input feature activation when the electronic device is stowed.

In one or more embodiments, when the at least one proximity sensor delivers an indication that the electronic device is in the stowed state, rather than relying solely upon the at least one proximity sensor, the one or more processors query other sensors to determine if the electronic device is indeed stowed. For example, in one or more embodiments the one or more processors query a touch sensor to see if a user is holding the electronic device. Where the touch sensor indicates the user is holding the electronic device, the one or more processors identify a conflict between the indicators delivered by the at least one proximity sensor (device stowed) and the touch sensor (device held).

In one or more embodiments, in response to this conflict, the one or more processors query at least one additional sensor to determine whether this additional sensor indicates that the electronic device is stowed or held. For example, in one or more embodiments the one or more processors query one or both of a front side imager and/or a second side imager to determine whether any objects are proximately located with the electronic device, e.g., are within a few centimeters of a housing of the electronic device. In other embodiments, the one or more processors query one or both of the front side imager and/or the second side imager to determine if a user is staring at the electronic device. In still other embodiments, the one or more processors can query a distance measurement sensor, such as a time of flight depth imager, a radar device, a sonar device, an ultrasound distance measurement device, or other distance measurement device, to determine distances between the electronic device and other objects. Of course, these techniques could be used in combination. Other techniques for determining whether the electronic device is held or stowed will be discussed below. Still others will be obvious to those of ordinary skill in the art having the benefit of this disclosure.

In one or more embodiments, where this additional sensor indicates that the electronic device is in the stowed state, the one or more processors omit, suppress, and/or preclude performance of the control operation in response to the received user input. However, where the additional sensor fails to indicate that the electronic device is in a stowed state, in one or more embodiments the one or more processors perform the control operation in response to the received user input. Advantageously, embodiments of the disclosure allow the performance of control operations in response to received user input despite the fact that a primary sensor, one example of which is that of a proximity detector component, is functioning improperly due to environmental conditions or otherwise. Embodiments of the disclosure provide for the querying of at least a touch sensor and one other sensor, in one or more embodiments, to determine whether the electronic device is indeed in a stowed state. Other advantages offered by embodiments of the disclosure will be described below. Still others will be obvious to those of ordinary skill in the art having the benefit of this disclosure.

Turning now to FIG. 1, illustrated therein is one explanatory electronic device 100 configured in accordance with one or more embodiments of the disclosure. In one or more embodiments, the electronic device 100 can be configured as a wearable device, such as a smart watch. For example, the electronic device can include a housing and one or more straps, which allow the electronic device 100 to be worn around a wrist as a watch or folded over and clipped to a garment. For illustration purposes, the electronic device 100 of FIG. 1 is configured as a non-wearable device, and in particular, is configured as a smartphone. Embodiments of the disclosure contemplate that the electronic device 100 could be configured as other devices as well, including as a tablet computer, a dedicated voice assistant device, a gaming device, a multimedia device, or other device. Other types of electronic devices will be obvious to those of ordinary skill in the art having the benefit of this disclosure.

The electronic device 100 of FIG. 1 includes a display 101, which may optionally be touch-sensitive. In an embodiment where the display 101 is touch-sensitive, users can deliver user input to the display 101 as touch input from a finger, stylus, or other objects disposed proximately with the display 101. In one embodiment, the display 101 is configured as an active matrix organic light emitting diode (AMOLED) display. However, it should be noted that other types of displays, including liquid crystal displays, would be obvious to those of ordinary skill in the art having the benefit of this disclosure.

The explanatory electronic device 100 of FIG. 1 includes a housing 102. Features can be incorporated into the housing 102. Examples of such features include a front-facing camera or imager 103, a rear-facing camera or imager 104, one or more microphones 105, and/or an optional speaker port 106. In this illustrative embodiment, a user interface component 107, which may be a button, touch sensor, or touch sensitive surface, can also be disposed along the housing 102. While some features are shown being disposed on the rear major face of the electronic device 100 in this embodiment, they could be located elsewhere, such as on the front major face, on side minor faces, or in other locations in other embodiments.

Also illustrated in FIG. 1 is one explanatory block diagram schematic 108 of the electronic device 100. In one or more embodiments, the block diagram schematic 108 is configured as a printed circuit board assembly disposed within the housing 102 of the electronic device 100. Various components can be electrically coupled together by conductors or a bus disposed along one or more printed circuit boards. It should be noted that the block diagram schematic 108 includes many components that are optional, but which are included in an effort to demonstrate how varied electronic devices configured in accordance with embodiments of the disclosure can be.

Illustrating by example, in one or more embodiments the electronic device 100 includes an audio input device 109 to receive audio input and an audio output device 110 to deliver audio output. Where the electronic device 100 is configured to be purely a voice assistant device, a display 101 would be optional, in that it is not required for this voice-based user interaction. Thus, it is to be understood that the block diagram schematic 108 of FIG. 1 is provided for illustrative purposes only and for illustrating components of one electronic device 100 in accordance with embodiments of the disclosure.

The block diagram schematic 108 of FIG. 1 is not intended to be a complete schematic diagram of the various components required for an electronic device 100. Therefore, other electronic devices in accordance with embodiments of the disclosure may include various other components not shown in FIG. 1, or may include a combination of two or more components or a division of a particular component into two or more separate components, and still be within the scope of the present disclosure.

The illustrative block diagram schematic 108 of FIG. 1 includes many different components. Embodiments of the disclosure contemplate that the number and arrangement of such components can change depending on the particular application. For example, a wearable electronic device may have fewer, or different, components from a non-wearable electronic device. Similarly, an electronic device configured as a dedicated voice assistant may have fewer, or different, components from a smartphone, and so forth. Accordingly, electronic devices configured in accordance with embodiments of the disclosure can include some components that are not shown in FIG. 1, and other components that are shown may not be needed and can therefore be omitted.

The illustrative block diagram schematic 108 includes a user interface 111. In one or more embodiments, the user interface 111 includes the display 101 and one or more other sensors, which include a touch sensor 118 and which will be described in more detail below.

In one embodiment, the electronic device 100 includes one or more processors 112. In one embodiment, the one or more processors 112 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the block diagram schematic 108. Each of the application processor and the auxiliary processor(s) can be configured to process and execute executable software code to perform the various functions of the electronic device 100 with which the block diagram schematic 108 operates. A storage device, such as memory 113, can optionally store the executable software code used by the one or more processors 112 during operation.

In this illustrative embodiment, the block diagram schematic 108 also includes a communication circuit 114 that can be configured for wired or wireless communication with one or more other devices or networks. The networks can include a wide area network, a local area network, and/or personal area network. The communication circuit 114 may also utilize wireless technology for communication, such as, but are not limited to, peer-to-peer or ad hoc communications such as HomeRF, Bluetooth and IEEE 802.11 and other forms of wireless communication such as infrared technology. The communication circuit 114 can include wireless communication circuitry, one of a receiver, a transmitter, or transceiver, and one or more antennas.

In one embodiment, the one or more processors 112 can be responsible for performing the primary functions of the electronic device with which the block diagram schematic 108 is operational. For example, in one embodiment the one or more processors 112 comprise one or more circuits operable with the user interface 111 to present presentation information to a user. Additionally, the one or more processors 112 can be operable with the audio output device 110 to deliver audio output to a user. The executable software code used by the one or more processors 112 can be configured as one or more modules 115 that are operable with the one or more processors 112. Such modules 115 can store instructions, control algorithms, and so forth.

In one or more embodiments, the block diagram schematic 108 includes an audio processor 116. In one or more embodiments, the audio processor 116 is operable to receive audio input from a source, such as a person or persons, who are situated within an environment 117 about the electronic device 100. The audio processor 116 can also receive audio input from the environment 116 as well. The audio processor 116 can include hardware, executable code, and speech monitor executable code in one embodiment.

In one embodiment, the audio processor 116 is configured to implement a voice control feature that allows the electronic device 100 to function as a voice assistant device, which is a digital assistant using voice recognition, speech synthesis, and natural language processing to receive audio input comprising a voice command from a source, determine the appropriate response to the voice command, and then deliver the response in the form of audio output in response to receiving the audio input from the source. When so configured, a user can speak commands to cause the one or more processors 112 of the electronic device 100 to execute a control operation. In one or more embodiments the audio processor 116 listens for voice commands, processes the commands and, in conjunction with the one or more processors 112, performs one or more control operations, such as delivering audio output, in response to receiving audio input.

Various sensors can be operable with the one or more processors 112. A first example of a sensor that can be included with the various sensors is a touch sensor 118. The touch sensor 118 can include a capacitive touch sensor, an infrared touch sensor, resistive touch sensors, or another touch-sensitive technology. Capacitive touch-sensitive devices, for example, include a plurality of capacitive sensors, e.g., electrodes, which are disposed along a substrate. Each capacitive sensor is configured, in conjunction with associated control circuitry, e.g., the one or more processors 112, to detect an object in close proximity with—or touching—the surface of the display 101 and/or the housing 102 of the electronic device 100 by establishing electric field lines between pairs of capacitive sensors and then detecting perturbations of those field lines. Other examples of touch sensors 118 will be obvious to those of ordinary skill in the art having the benefit of this disclosure.

In one or more embodiments, a touch sensor 118 is disposed along the rear surface of the housing 102 of the electronic device 100 and is configured to determine when the electronic device 100 is being held. Where the display 101 is touch sensitive, it will include its own touch sensor 118 as well. The touch sensor 118 could be located at various locations along the electronic device 100, including the major front and rear surfaces, the minor side surfaces, corners or other locations.

An imager processor system 120 can be included in the electronic device 100 and can be operable with the one or more processors 112. The imager processor system can include one or more sensors, which can include the front-facing camera or imager 103, the rear-facing camera or imager 104, or another imager. In one or more embodiments the one or more sensors operable with the imager processor system 120 comprise at least one or more of an imager 121, a depth imager 122, and one or more proximity sensors 123.

In one embodiment, the imager 121 comprises a two-dimensional imager configured to receive at least one image of a person or other objects within an environment of the electronic device 100. In one embodiment, the imager 121 comprises a two-dimensional Red-Green-Blue (RGB) imager. In another embodiment, the imager 121 comprises an infrared imager. Other types of imagers suitable for use as the imager 121 of electronic device 100 will be obvious to those of ordinary skill in the art having the benefit of this disclosure.

The depth imager 122 can take a variety of forms. In a first embodiment, the depth imager 122 comprises a pair of imagers separated by a predetermined distance, such as three to four images. This "stereo" imager works in the same way the human eyes do in that it captures images from two different angles and reconciles the two to determine distance.

In another embodiment, the depth imager 122 employs a structured light laser. The structured light laser projects tiny light patterns that expand with distance. These patterns land on a surface, such as a user's face, and are then captured by an imager. By determining the location and spacing between the elements of the pattern, three-dimensional mapping can be obtained.

In still another embodiment, the depth imager 122 comprises a time of flight device. Time of flight three-dimensional sensors emit laser or infrared pulses from a photodiode array. These pulses reflect back from a surface, such as the user's face. The time it takes for pulses to move from the photodiode array to the surface and back determines distance, from which a three-dimensional mapping of a surface can be obtained. Regardless of embodiment, when included the depth imager 122 adds a third "z-dimension" to the x-dimension and y-dimension defining the two-dimensional image captured by the imager 121.

In one embodiment when the imager processor system 120 detects a person, one or both of the imager 121 and/or the depth imager 122 can capture a photograph and/or depth scan of that person. The imager processor system 120 can then compare the image and/or depth scan to one or more predefined authentication references stored in the memory 113. This comparison, in one or more embodiments, is used to confirm beyond a threshold authenticity probability that the person's face—both in the image and the depth scan—sufficiently matches one or more of the predefined authentication references stored in the memory 113 to authenticate a person as an authorized user of the electronic device 100. Beneficially, this optical recognition performed by the imager processor system 120 can allow access to the electronic device 100 only when one of the persons detected about the electronic device 100 are sufficiently identified as an authorized user of the electronic device 100.

The one or more proximity sensors 123 can also take various forms. In one or more embodiments, the one or more proximity sensors 123 fall in to one of two camps: active proximity sensors and "passive" proximity sensors. Either the proximity detector components or the proximity sensor components can be generally used for distance determination, such as measuring distances between objects situated within the environment 117 of the electronic device and/or determining changes in distance between the electronic device 100 and objects situated within the environment 117.

As used herein, a "proximity sensor component" comprises a signal receiver only that does not include a corresponding transmitter to emit signals for reflection off an object to the signal receiver. A signal receiver only can be used due to the fact that an external source, such as the body of a person or other heat-generating object external to the electronic device 100, can serve as the transmitter. Illustrating by example, in one embodiment the proximity sensor components comprise only a signal receiver to receive signals from objects external to the housing 102 of the electronic device 100. In one embodiment, the signal receiver is an infrared signal receiver to receive an infrared emission from a source, such as a human being, when the human being is approaching or near the electronic device 100.

Proximity sensor components are sometimes referred to as a "passive IR detectors" due to the fact that a person or other warm object serves as the active transmitter. Accordingly, the proximity sensor component requires no transmitter since objects disposed external to the housing deliver emissions that are received by the infrared receiver. As no transmitter is required, each proximity sensor component can operate at a very low power level.

In one embodiment, the signal receiver of each proximity sensor component can operate at various sensitivity levels so as to cause the at least one proximity sensor component to be operable to receive the infrared emissions from different distances. For example, the one or more processors 112 can cause each proximity sensor component to operate at a first "effective" sensitivity so as to receive infrared emissions from a first distance. Similarly, the one or more processors 112 can cause each proximity sensor component to operate at a second sensitivity, which is less than the first sensitivity, so as to receive infrared emissions from a second distance, which is less than the first distance. The sensitivity change can be effected by causing the one or more processors 112 to interpret readings from the proximity sensor component differently.

By contrast, "proximity detector components" include a signal emitter and a corresponding signal receiver, which constitute an "active" pair. While each proximity detector component can be any one of various types of proximity sensors, such as but not limited to, capacitive, magnetic, inductive, optical/photoelectric, imager, laser, acoustic/sonic, radar-based, Doppler-based, thermal, and radiation-based proximity sensors, in one or more embodiments the proximity detector components comprise infrared transmitters and receivers that define an active IR pair.

In one or more embodiments, each proximity detector component can be an infrared proximity sensor set that uses a signal emitter that transmits a beam of infrared light that reflects from a nearby object and is received by a corresponding signal receiver. Proximity detector components can be used, for example, to compute the distance to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals.

Figure 3:
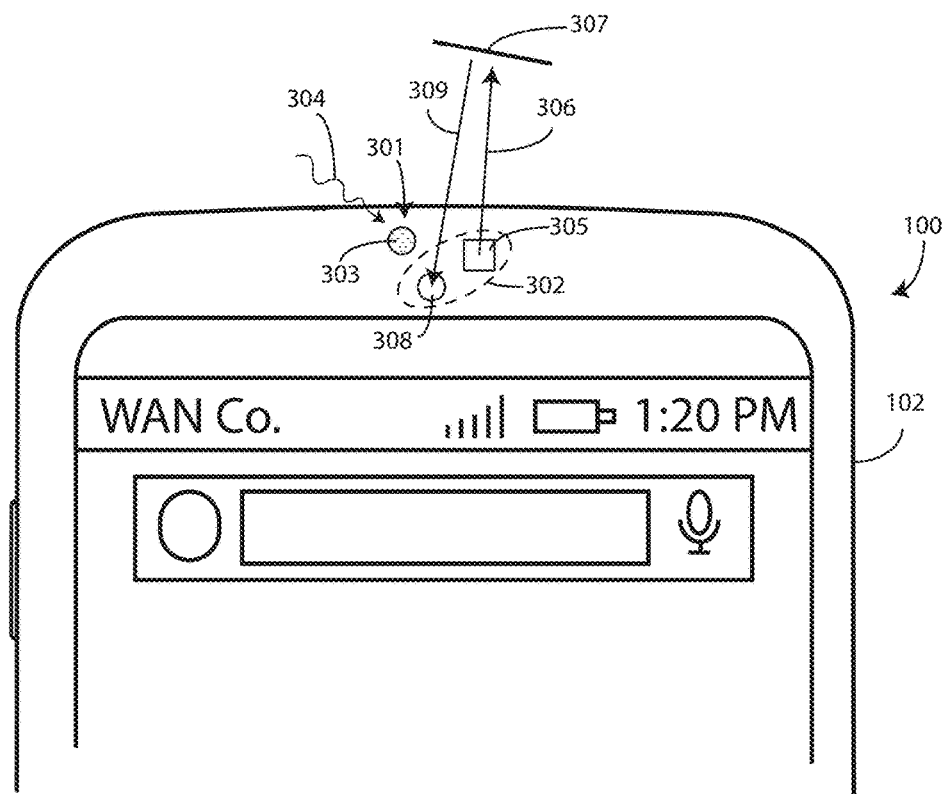
FIG. 3 illustrates one or more explanatory proximity sensors in accordance with one or more embodiments of the disclosure.

Turning briefly to FIG. 3, illustrated therein is the difference between a proximity sensor component 301 and a proximity detector components 302 as those terms are used herein. Illustrated therein are a proximity sensor component 301 and a proximity detector component 302. These components can be disposed at different locations along the housing 102, including corners, major faces, minor faces, and so forth.

In this embodiment, the proximity sensor component 301 comprises a signal receiver 303 only. One example of a signal receiver 303 is that of an infrared photodiode to detect an infrared emission 4 from an object external to the housing 102 of the electronic device 100. No corresponding transmitter is included or required for the proximity sensor component 301 to function. As no active transmitter emitting signals is included, the proximity sensor component 301 is sometimes referred to as a "passive IR" proximity sensor. As the proximity sensor component 301 receives thermal emissions from an object, in one or more embodiments they can be used as temperature sensors.

By contrast, the proximity detector component 302 can be an infrared proximity sensor set that uses a signal emitter 305 that transmits a beam 306 of infrared light that reflects 307 from a nearby object and is received by a corresponding signal receiver 308. A proximity detector component 302 can be used, for example, to compute the distance to any nearby object from characteristics associated with the reflected signals 309. The reflected signals 309 are detected by the corresponding signal receiver 308, which may be an infrared photodiode used to detect reflected light emitting diode (LED) light, respond to modulated infrared signals, and/or perform triangulation of received infrared signals. Accordingly, the proximity detector component 302 can be used to determine of the electronic device 100 is covered by clothing in one or more embodiments.

Figure 2:
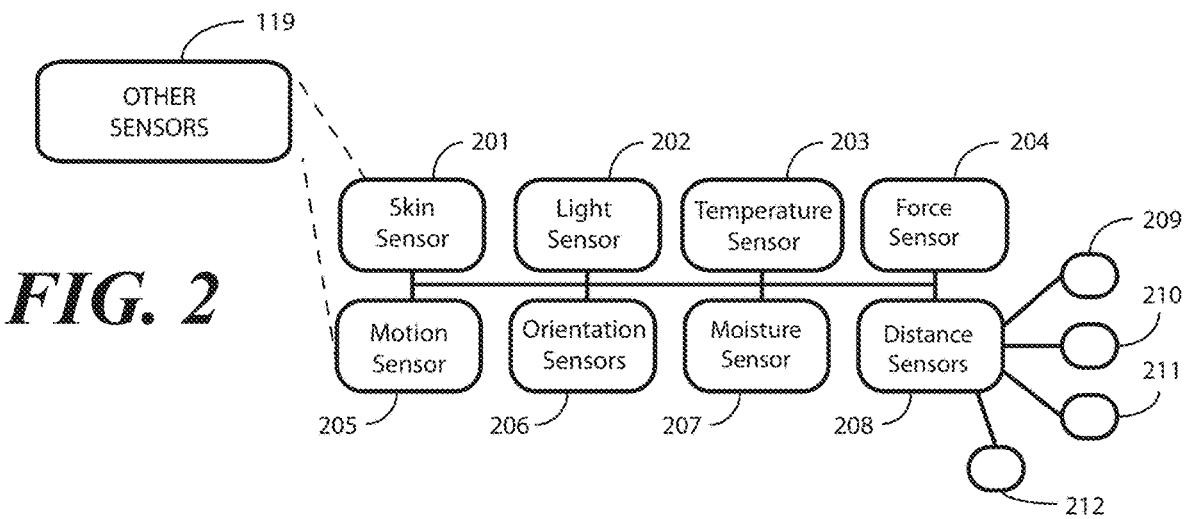
FIG. 2 illustrates one or more sensors suitable for inclusion with an explanatory electronic device in accordance with one or more embodiments of the disclosure.

Turning now back to FIG. 1, other sensors 119 can be operable with the one or more processors 112 as well. Turning briefly to FIG. 2, illustrated therein are several examples of other sensors 119 suitable for inclusion in the electronic device 100 in various combinations.

In one embodiment, a skin sensor 201 is configured to determine when the electronic device (100) is touching the skin of a person. For example, in one or more embodiments the skin sensor 201 can determine when the electronic device (100) is being held within the hand of a user. In one embodiment, the skin sensor 201 can include a substrate with an electrode disposed thereon. The electrode can confirm the object touching the skin sensor 201 is skin by detecting electrical signals generated by a heartbeat in one embodiment. Other forms of skin sensors will be obvious to those of ordinary skill in the art having the benefit of this disclosure.

The other sensors 119 can include a light sensor 202. The light sensor 202 can be used to detect whether or not direct light is incident on the housing (102) of the electronic device (100) in one or more embodiments. The light sensor 202 can also be used to detect an intensity of ambient light is above or below a predefined threshold in one or more embodiments.

In one or more embodiments the light sensor 202 can detect changes in optical intensity, color, light, or shadow in the near vicinity of the electronic device (100). This can be used to make inferences about whether the electronic device (100) is in a stowed state. If, for example, the light sensor 202 detects low-light conditions, i.e., when the intensity of received ambient light is below a predefined threshold, this can indicate that the electronic device (100) is disposed within a pocket, drawer, or purse. In one embodiment, the light sensor 202 can be configured as an image-sensing device that captures successive images about the device and compares luminous intensity, color, or other spatial variations between images to detect weather conditions.

A temperature sensor 203 can be configured to monitor the temperature of the environment. The temperature sensor 203 can take various forms. In one embodiment, the temperature sensor 203 is simply a proximity sensor component. In another embodiment, the temperature sensor 203 comprises a simple thermopile. In another embodiment, the temperature sensor 203 comprises an infrared imager that captures the amount of thermal energy emitted by an object. Other types of temperature sensors will be obvious to those of ordinary skill in the art having the benefit of this disclosure.

The other sensors 119 can include a force sensor 204. The force sensor 204 can take various forms. For example, in one embodiment, the force sensor 204 comprises resistive switches or a force switch array configured to detect contact with one or both of the display (101) or the housing (102) of the electronic device (100). In another embodiment, the force sensor 204 can be capacitive. In yet another embodiment, piezoelectric sensors can be configured to sense force as well. Other types of force sensors will be obvious to those of ordinary skill in the art having the benefit of this disclosure.

The other sensors 119 can include one or more motion sensors 205. The one or more motion sensors 205 can include one or more accelerometers or gyroscopes. For example, an accelerometer may be embedded in the electronic circuitry of the electronic device (100) to show vertical orientation, constant tilt and/or whether the electronic device (100) is stationary. The measurement of tilt relative to gravity is referred to as "static acceleration," while the measurement of motion and/or vibration is referred to as "dynamic acceleration." A gyroscope can be used in a similar fashion.

In one or more embodiments, the one or more motion sensors 205 can detect motion of the electronic device (100). The one or more motion sensors 205 can be used to sense some of the gestures of a user as well. The one or more motion sensors 205 can be used to determine the spatial orientation of the electronic device (100) as well in three-dimensional space by detecting a gravitational direction. The one or more motion sensors 205 can also include an electronic compass to detect the spatial orientation of the electronic device (100) relative to the earth's magnetic field.

The other sensors 119 can also include one or more microphones 206 operable to receive acoustic input. While the one or more microphones 206 can be used to sense voice input, voice commands, and other audio input, in one or more embodiments they can also be used as environmental sensors to sense environmental sounds such as rumpling of soft surfaces of textile materials or other similar materials encapsulating the electronic device (100) when the electronic device 100 is in a stowed state. Alternatively, the one or more microphones 206 can be used to detect the nearby presence of items when the electronic device (100) is in a stowed state, such as coins, medications, grooming items, notecards, keys, lotions, notepads, lip balm, and other items that may be near the electronic device (100) when stowed in a container such as a purse.

The other sensors 119 can also include a moisture sensor 207. The moisture sensor 207 can be configured to detect the amount of moisture on or about the display (101) or the housing (102) of the electronic device (100). The moisture sensor 207 can be realized in the form of an impedance sensor that measures impedance between electrodes. Other types of moisture sensors will be obvious to those of ordinary skill in the art having the benefit of this disclosure.

The other sensors 119 can include a distance measurement sensor 208. The distance measurement sensor 208 can take various forms. In one or more embodiments, the distance measurement sensor 208 comprises a time of flight depth imager 209, which can also be one form of depth imager (122) as described above. In another embodiment, the distance measurement sensor 208 can comprise a radar device 210. In still another embodiment, the distance measurement sensor 208 can comprise a sonar device 211. In yet another embodiment, the distance measurement sensor 208 can comprise an ultrasound distance measurement device 212.

Regardless of type, in one or more embodiments the distance measurement sensor 208 can perform distance determination operations. For example, the distance measurement sensor 208 can measure distances between objects situated within the environment (117) of the electronic device (100) in one or more embodiments. In other embodiments, the distance measurement sensor 208 can determine changes in distances between the electronic device (100) and objects situated within the environment (117). Combinations of these operations can be performed as well.

Turning now back to FIG. 1, a context engine 124 can be operable with the other sensors 119 to detect, infer, capture, and otherwise determine persons and actions that are occurring in an environment 117 about the electronic device 100. For example, where included one embodiment of the context engine 124 determines assessed contexts and frameworks using adjustable algorithms of context assessment employing information, data, and events. These assessments may be learned through repetitive data analysis. Alternatively, a user may employ the user interface 111 to enter various parameters, constructs, rules, and/or paradigms that instruct or otherwise guide the context engine 124 in detecting stowed states of the electronic device 100, held states of the electronic device 100, multi-modal social cues, emotional states, moods, and other contextual information. The context engine 124 can comprise an artificial neural network or other similar technology in one or more embodiments.

In one or more embodiments, the context engine 124 is operable with the one or more processors 112. In some embodiments, the one or more processors 112 can control the context engine 124. In other embodiments, the context engine 124 can operate independently, delivering information gleaned from detecting stowed states of the electronic device 100, held states of the electronic device 100, multi-modal social cues, emotional states, moods, and other contextual information to the one or more processors 112. The context engine 124 can receive data from the other sensors 119. In one or more embodiments, the one or more processors 112 are configured to perform the operations of the context engine 124.

Other components 125 operable with the one or more processors 112 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as the one or more loudspeakers or other alarms and/or buzzers. The other components 125 can also include a mechanical output component such as vibrating or motion-based mechanisms.

Figure 4:
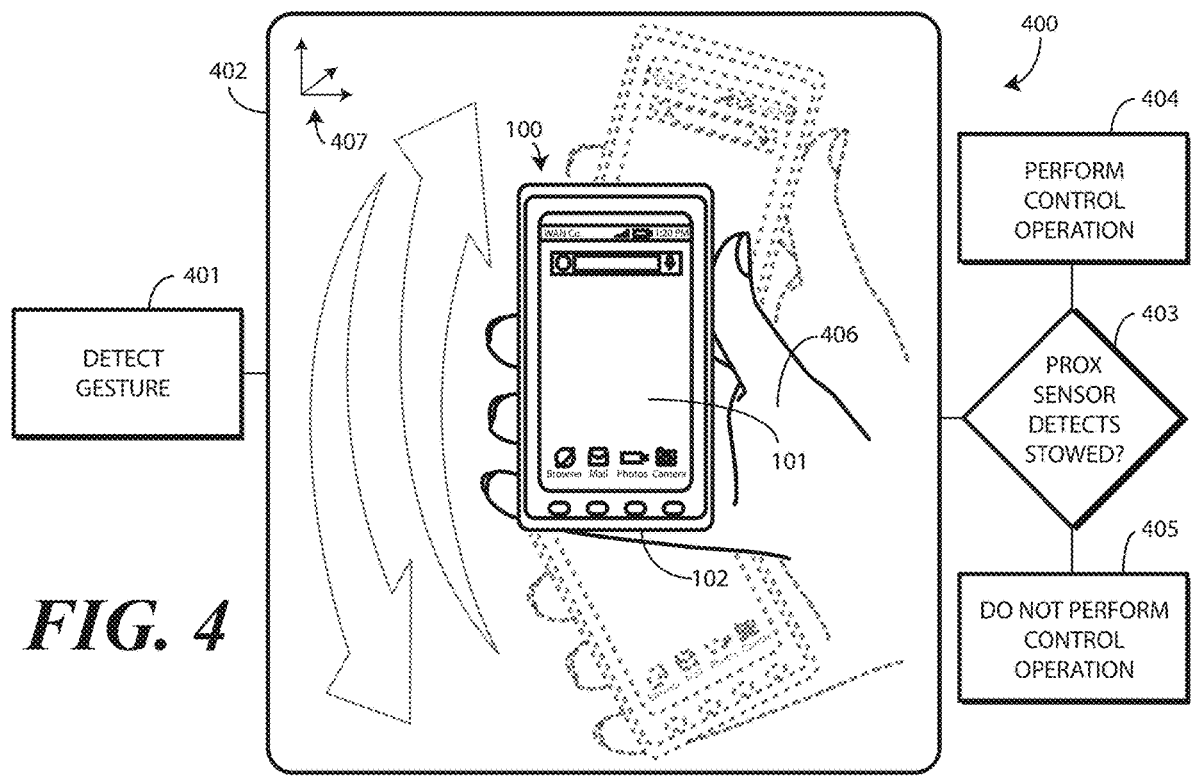
FIG. 4 illustrates one explanatory method in accordance with one or more embodiments of the disclosure.

Now that various hardware components have been described, attention will be turned to methods of using electronic devices in accordance with one or more embodiments of the disclosure. Turning now to FIG. 4, illustrated therein is one explanatory method 400 for the electronic device 100 of FIG. 1. More detailed methods will be described thereafter with reference to subsequent figures.

Beginning at step 401, one or more processors (112) of the electronic device 100 receive, at the user interface (111), user input requesting performance of a control operation. In one or more embodiments, this user input comprises gesture input. The gesture input can take a variety of forms. Illustrating by example, in one embodiment the gesture input comprises a hand or other object approaching the electronic device 100, as detected by the one or more proximity sensors (123), depth imager (122) or other sensors (119). In another embodiment, the gesture input comprises a user 406 twisting the electronic device 100 in three-dimensional space 407, as detected by the motion sensor (205), imager (121), or other sensors (119).

In still another embodiment, the user 406 can deliver the gesture input by moving a hand or arm in predefined motions in close proximity to the electronic device 100, as detected by the one or more proximity sensors (123), the imager (121), the depth imager (122), or the other sensors (119). In yet another embodiment, the user 406 can deliver gesture input by lifting, shaking, or otherwise deliberately moving the electronic device 100 in three-dimensional space 407, as detected by the motion sensor (205), imager (121), or other sensors (119). Other modes of delivering gesture input will be obvious to those of ordinary skill in the art having the benefit of this disclosure.

As shown at step 402, in this illustrative embodiment the user 406 is shaking the electronic device 100 up and down in a "chop chop" motion. Said differently, in this illustrative embodiment the user input received at step 402 comprises gesture input translating the electronic device 100 back and forth in three-dimensional space 407.

In one or more embodiments, this gesture input comprises a predefined gesture input associated with a control operation to be performed by the one or more processors (112) of the electronic device 100. Thus, the gesture input received at step 402 comprises a request for the one or more processors (112) to perform a predefined control operation.

The predefined control operation can vary, just as does the predefined gesture input. Illustrating by example, in one embodiment the control operation comprises actuation of the display 101, which corresponds to a gesture input of a hand or other object approaching the electronic device 100. In another embodiment, the control operation comprises actuating a flashlight mode, e.g., by illuminating the display 101 to a maximum brightness or by causing a flash of the imager (121) to illuminate, which corresponds to the gesture input of shaking the electronic device 100 up and down in a "chop chop" motion in three-dimensional space 407.

In still another embodiment, the control operation comprises transitioning the electronic device 100 from a first mode of operation to a second mode of operation, which corresponds to the gesture input of lifting the electronic device 100 from a first elevation to a second, higher elevation in three-dimensional space 407. Illustrating by example, the one or more processors (112) may change the gain of the audio output device (110) from a first level, where audible output from the electronic device 100 can be heard by the user 406 at a first distance, to a second gain where audible output can be heard at a second, lesser distance.

For instance, in one embodiment the one or more processors (112) are operable to operate one or both of the audio input device (109) and/or the audio output device (110) in a first mode at a first gain so that audible output is produced at a first output level. In one embodiment, the first output level is a volume sufficient that the audible output can be heard from more than one foot away from the device. If the electronic device 100 is a smartphone, for instance, the one or more processors (112) may operate one or both of the audio input device (109) and/or the audio output device (110) in a first mode at a first gain to produce output at a louder volume when operating in a speakerphone mode for example. Similarly, the one or more processors (112) may operate the one or both of the audio input device (109) and/or the audio output device (110) in a first mode at a first gain to produce audible output at a first output level so that the user 406 can hear the audible output from a user several feet away.

In one embodiment, the one or more processors (112) may further operate the one or both of the audio input device (109) and/or the audio output device (110) in a second mode at a second gain to produce audible output at a second output level. In one embodiment, the second gain is less than the first gain such that the second output level is at a lower volume than the first output level. This results in audible output only being audible from closer distances due to the lower output levels. If the electronic device 100 is a smartphone, for instance, the one or more processors (112) may operate the one or both of the audio input device (109) and/or the audio output device (110) in a second mode at a second gain to deliver audible output to the user 406 when the electronic device 100 is placed against the user's face. Similarly, the one or more processors (112) may operate one or both of the audio input device (109) and/or the audio output device (110) in a second mode at a second gain to deliver audible output to a user's ear when the audio output device (110) is only an inch (or less) from the user's head.

In one embodiment, this second mode of operation, i.e., where the second output level is less than the first output level, is known as the "discrete mode" of operation. In one or more embodiments, this control operation of transitioning from the normal mode of operation to the discrete mode of operation corresponds to the gesture input of translating the electronic device 100 in three-dimensional space 407 from a first elevation to a second, higher elevation.

In one or more embodiments, the one or more processors (112) perform the control operation at step 404 in response to receiving the gesture input at step 401. Thus, in one or more embodiments when the electronic device 100, using one or more sensors, detects the gesture at step 401, one or more processors (112) of the electronic device 100 can perform a corresponding control operation in response at step 404. Advantageously, this use of gesture input, one example of which is shown at step 402, provides a natural, immediate, and intuitive method of controlling the electronic device 100 without the necessity of delivering voice commands or touch input to the user interface (111) of the electronic device 100. Using the method 400 of FIG. 4, the user 406 can trigger, activate, actuate, or initiate control functions and perform control operations via simple gesture motions.

In one or more embodiments, the one or more processors (112) of the electronic device 100 are configured only to perform the control operation when the electronic device 100 is not in a stowed state. Said differently, in one or more embodiments the one or more processors (112) of the electronic device 100 are not to perform the control operation at step 404 if the electronic device is in a stowed state. As used herein, a "stowed" state occurs when a surrounding material or enclosure substantially encloses, envelops, or surrounds the electronic device 100. By contrast, a "held" state occurs when the user 406 is holding, grasping, or touching the electronic device 100.

In one or more embodiments, the one or more processors (112) receive data from the various sensors (119) of the electronic device 100 to determine the state of the electronic device 100. Examples of possible states include the stowed state, such as may occur when the electronic device 100 is located within a bag, pocket, briefcase, or other enclosure, and a held state where the user 406 is holding the electronic device 100 in a hand, be it close to, or some distance away, from their head or body. More granular analyses can be performed as well, such as determining whether the electronic device 100 is near the user's head or extended distally away from their body as well.

If the electronic device 100 is in a pocket and a lift motion occurs, such as may be detected if the user 406 is swinging on a swing set or jumping on a trampoline, in one or more embodiments the one or more processors (112) of the electronic device 100 preclude the execution of a control operation at step 405 despite the fact that a predefined "gesture" has been detected. If the lifting gesture causes actuation of a camera, for example, it may be undesirable to actuate the camera in a pocket or purse, as doing so may deplete the battery of the device or inadvertently capture unrecognizable pictures that unnecessarily consume memory. Accordingly, in one or more embodiments the one or more processors preclude the performance of a control operation in response to gesture input even when one or more sensors may indicate that the gesture input was received.

Decision 403 determines whether the electronic device 100 is in a stowed state. This can occur in a variety of ways. Illustrating by example, in one or more embodiments decision 403 comprises the one or more processors (112) of the electronic device 100 receiving an analyzing data from the various sensors (119). For example, the imager (121) or light sensor (202) may detect a low light level for more than a predefined amount of time to determine the electronic device 100 is in a stowed state. Similarly, the one or more motion sensors (205) may detect motion consistent with the electronic device 100 being situated in a pocket while the user 406 is walking, or while swinging in a handbag. The one or more proximity sensors 123 may also detect multiple nearby surfaces. The one or more processors (112) may consider any information indicating that the electronic device 100 is within an enclosure, and therefore in a stowed state at decision 403.

Decision 403 can comprise the one or more processors (112) analyzing data from multiple sensors. The one or more sensors (119) may combine the data, apply weighting factors to the data, or otherwise manipulate the data in this analysis. The motion sensors (205), determining orientation, may detect that the electronic device 100 is upside down from its normal use orientation. The one or more processors (112) may analyze the similarity or differences in light received from the imager (121) and light sensor (202), and so forth. Other techniques for determining decision 403 will be obvious to those of ordinary skill in the art having the benefit of this disclosure.

In one or more embodiments, the one or more proximity sensors (123) are primarily designated to determine whether the electronic device 100 is in a stowed state at decision 403. In one or more embodiments, the one or more processors (112) of the electronic device 100 use the one or more proximity sensors (123) to determine that the electronic device 100 is in the stowed state of being in a pocket, for example, by determining whether an object, such as clothing, textile materials, or other natural, synthetic, or blend layer is covering the one or more proximity sensors (123). Alternatively, decision 403 can comprise the one or more processors (112) receiving signals from the one or more proximity sensors (123) indicating that an object, such as a textile material, is less than a predefined distance from the housing 102 or display 101 of the electronic device 100, thereby indicating that the electronic device 100 is covered by the object. Where this occurs, the one or more processors can conclude that the electronic device 100 is disposed within a pocket or is otherwise stowed.

Embodiments of the disclosure contemplate that when a proximity sensor, be it a proximity detector component, proximity sensor component, or other form of proximity sensor, is primarily charged with determining whether the electronic device 100 is in a stowed state at decision 403, this situation can give rise to false detection situations in which the proximity sensor indicates that the electronic device 100 is in a stowed state despite the fact that this is not true. If, for example, the user 100 has their hand or finger directly atop the proximity sensor, the proximity sensor may deliver signals comprising an indication that the electronic device 100 is in a stowed state despite the fact that it is actually in the user's hand. Similarly, if the housing 102 or fascia atop the display 101 of the electronic device 100 where the one or more proximity sensors (123) are located is covered in debris or is otherwise obscured, the one or more proximity sensors (123) may indicate that the electronic device 100 is in a stowed state even when it is not.

Moreover, if a sticker or other object is adhering to the housing 102 or fascia atop the display 101 of the electronic device 100 where the one or more proximity sensors (123) are located, this situation can cause the one or more proximity sensors (123) to indicate that the electronic device 100 is in a stowed state even when it is not. Failure or compromised performance of the one or more proximity sensors (123) can also cause an indication of a stowed state when the electronic device 100 is not stowed. When such failures or compromised performance becomes extended or permanent, gesture control can effectively be disabled.

Figure 5:
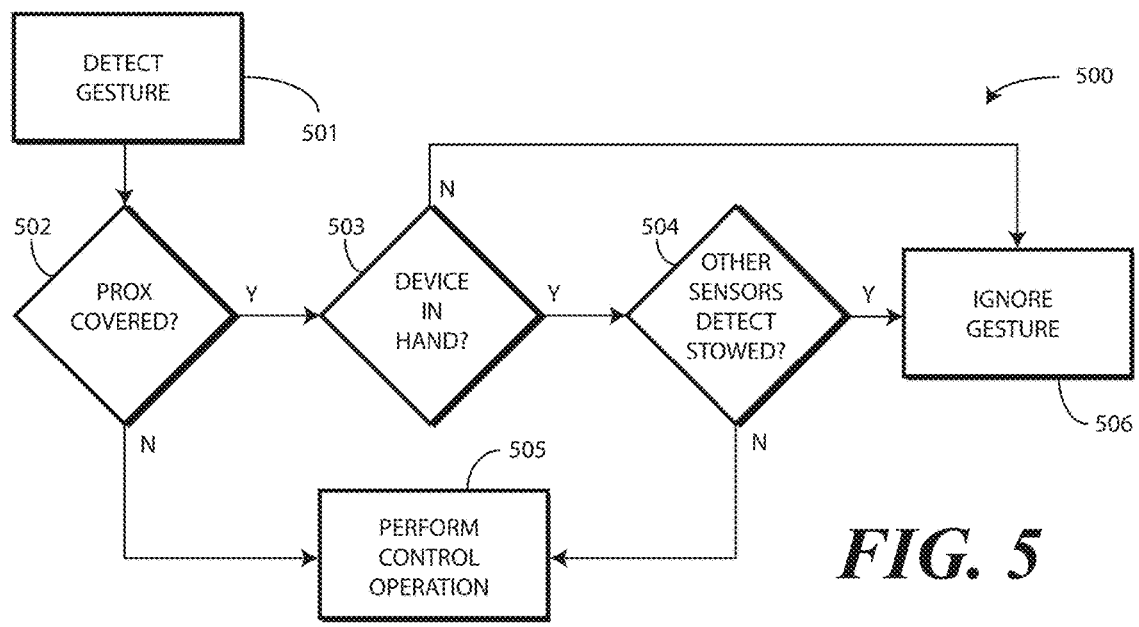
FIG. 5 illustrates another explanatory method in accordance with one or more embodiments of the disclosure.

Advantageously, embodiments of the disclosure provide methods and systems of verifying whether an electronic device 100 is in a stowed state or held state when one or more proximity sensors (123) indicate that the electronic device is in the stowed state. Turning now to FIG. 5, illustrated therein is one such method 500.

The method 500 of FIG. 5 provides a backstop for situations in which the one or more proximity sensors (123) falsely deliver an indication that the electronic device (100) is in a stowed state, which can occur for any of the reasons set forth above, in addition to others. Advantageously, the method 500 of FIG. 5 facilitates the performance of control operations in response to received user input despite the fact that a primary sensor, which comprises the one or more proximity sensors (123) in this explanatory example, is functioning improperly due to environmental conditions or other factors. The method 500 of FIG. 5 facilitates querying of at least the touch sensor (118) and one other sensor, such as the other sensors (119), the imager (121), or the depth imager (122), in one or more embodiments, to determine whether the electronic device (100) is indeed in a stowed state.

Beginning at step 501, one or more processors (112) of the electronic device (100) receive, at the user interface (111), user input requesting performance of a control operation. In one or more embodiments, this user input comprises gesture input, as previously described.

At decision 502, the one or more processors (112) query the one or more proximity sensors (123) to determine whether the electronic device (100) is in a stowed state or a held state. For the purposes of this example, presume that the electronic device (100) is not in a stowed state. Where the one or more proximity sensors (123) are working properly and the environment and/or surroundings and conditions of the electronic device (100) allow them to function, the one or more processors (112) will receive, at decision 502, an indication that the electronic device (100) is in a held state. Accordingly, the method 500 will proceed to step 505 where the one or more processors (112) perform the control operation in response to receiving the gesture input received or detected at step 501. Thus, in one or more embodiments where step 501 comprises the one or more processors (112) of the electronic device (100) detecting the gesture at step 501, step 505 comprises the one or more processors (112) of the electronic device 100 performing a corresponding control operation in response at step 505.

However, where due to environment, condition, or other factors the one or more proximity sensors (123) are not working properly, decision 502 may comprise the one or more processors (112) receiving an indication from the one or more proximity sensors (123) that the electronic device (100) is in a stowed state despite the fact that it is not. In one or more embodiments, decision 502 is performed while step 501 is occurring. Said differently, in one or more embodiments the receipt of user input at step 501 occurs during the receipt of the indication that the electronic device (100) is in the stowed state at decision 502.

Where this occurs, i.e., when the one or more processors (112) receive from one or more proximity sensors (123) an indication that the electronic device (100) is in the stowed state despite the fact that it is not, the method 500 moves to decision 503 in one or more embodiments.

In one or more embodiments, decision 503 comprises the one or more processors (112) determining, with one or more sensors of the electronic device (100), and in response to receiving the indication from the one or more proximity sensors (123) that the electronic device (100) is in a stowed state at decision 502, whether the one or more sensors indicate that the electronic device 100 is in a held state. In one or more embodiments, this comprises the one or more processors (112) querying the touch sensor (118) to determine if a user (406) is holding the electronic device 100.

Illustrating by example, in one or more embodiments the touch sensor (118) can deliver a signal to the one or more processors (112) that the electronic device (100) is in a held state when its sensor technology, be it capacitive, infrared, resistive touch sensors, or another touch-sensitive technology, detects an object in close proximity with—or touching—the surface of the display (101) and/or the housing (102) of the electronic device (100), thereby determining whether the electronic device (100) is being held.

Where the touch sensor (118) indicates that the electronic device (100) is in the stowed state, i.e., that the electronic device (100) is not being held, in one or more embodiments the one or more processors (112) employ this data as confirmation that the one or more proximity sensors (123) are working properly and that the indication that the electronic device (100) is in the stowed state, received at decision 502, is valid. Accordingly, the method 500 proceeds to step 506. In one or more embodiments, step 506 comprises omitting performance of the control operation in response to the one or more sensors, e.g., the touch sensor (118) in this example, failing to indicate that the electronic device (100) is in the held state.

However, where the touch sensor (118) indicates that the electronic device (100) is in the held state, i.e., where the touch sensor (118) indicates the user (406) is holding the electronic device (100), the one or more processors (112) identify a conflict between the indicators delivered by the at least one proximity sensor at decision 502 (device stowed) and the touch sensor at decision 503 (device held). Accordingly, the method 500 moves to decision 504.

In one or more embodiments, in response to this conflict, the one or more processors (112) query at least one additional sensor to determine whether this additional sensor indicates that the electronic device (100) is stowed or held. In one or more embodiments, decision 504 thus comprises the one or more processors (112) querying one or more other sensors of the electronic device (100), i.e., not the one or more proximity sensors (123) or touch sensor (118), regarding whether the electronic device (100) is in the stowed state. In one or more embodiments, decision 504 comprises the one or more processors (112) determining, with the one or more other sensors, and in response to the one or more sensors, e.g., the touch sensor (118) in this example, indicating that the electronic device (100) is in the held state, whether the one or more other sensors indicate that the electronic device (100) is in the stowed state.

Decision 504 can occur in a variety of ways. For example, in one or more embodiments the one or more processors (112) query one or both of a front-facing camera or imager (103) and/or a rear-facing camera or imager (104) to determine whether any objects are proximately located with the electronic device (100), e.g., are within a few centimeters of the housing (102) or display (101) of the electronic device (100). Where they are, the one or more processors (112) conclude that the one or more proximity sensors (123) are working properly and that the indication that the electronic device (100) is in the stowed state, received at decision 502, is valid. Accordingly, the method 500 proceeds to step 506. In one or more embodiments, step 506 comprises omitting performance of the control operation in response to the one or more other sensors, e.g., the one or both of a front-facing camera or imager (103) and/or a rear-facing camera or imager (104) in this example, indicating that the electronic device (100) is in the stowed state.

In other embodiments, the one or more processors (112) query one or both of the front-facing camera or imager (103) and/or the rear-facing camera or imager (104) to determine if the user (406) is staring at the electronic device (100). Where the user (406) is not staring at the electronic device (100), in one or more embodiments the one or more processors (112) conclude that the one or more proximity sensors (123) are working properly and that the indication that the electronic device (100) is in the stowed state, received at decision 502, is valid. Accordingly, the method 500 proceeds to step 506, which again comprises omitting performance of the control operation in response to the one or more other sensors, e.g., the one or both of a front-facing camera or imager (103) and/or a rear-facing camera or imager (104) in this example, indicating that the electronic device (100) is in the stowed state.

In still other embodiments, the one or more processors (112) can query the distance measurement sensor (208), which can be one or more of the time of flight depth imager (209), the radar device (210), the sonar device (211), the ultrasound distance measurement device (212), or another distance measurement device. In one or more embodiments, the one or more processors (112) query the distance measurement sensor (208) to determine distances between the electronic device and other objects. If the distance is within a predefined distance threshold, such as one or two inches, the one or more processors (112) conclude that the one or more proximity sensors (123) are working properly and that the indication that the electronic device (100) is in the stowed state, received at decision 502, is valid. Accordingly, the method 500 proceeds to step 506, which again comprises omitting performance of the control operation in response to the one or more other sensors, e.g., the distance measurement sensor (208) in this example, indicating that the electronic device (100) is in the stowed state.

The one or more other sensors can indicate that the electronic device (100) is in the stowed state in still other ways as well. For example, the light sensor (202) and/or one or both of the front-facing camera or imager (103) and/or the rear-facing camera or imager (104) may detect a low light level existing for more than a predefined time period. Similarly, the one or more motion sensors (205) can detect motion consistent with being in a pants pocket or swinging in a handbag. Other techniques for the one or more other sensors to determine the electronic device (100) is in the stowed state will be obvious to those of ordinary skill in the art having the benefit of this disclosure. Regardless of how this occurs, in one or more embodiments when it does the method 500 proceeds to step 506 where performance of the control operation is omitted, precluded, or suppressed in response to the one or more other sensors indicating that the electronic device (100) is in the stowed state.

On the other hand, where the one or more other sensors indicate, at decision 504, that the electronic device (100) is not in a stowed state, e.g., when the electronic device (100) is in a held state, the method 500 moves to step 505 where the one or more processors (112) perform the control operation in response to receiving the gesture input received or detected at step 501. Thus, in one or more embodiments where step 501 comprises the one or more processors (112) of the electronic device (100) detecting the gesture at step 501, step 505 comprises the one or more processors (112) of the electronic device 100 performing a corresponding control operation in response at step 505 when the one or more other sensors fail to indicate that the electronic device (100) is in the stowed state at decision 504.

The one or more processors (112) can determine from the one or more other sensors at decision 504 that the electronic device (100) is not in a stowed state in a variety of ways. For example, in one or more embodiments the one or more processors (112) query one or both of the front-facing camera or imager (103) and/or the rear-facing camera or imager (104) to determine whether any objects are proximately located with the electronic device (100), e.g., are within a few centimeters of the housing (102) or display (101) of the electronic device (100). Where they are not, the one or more processors (112) conclude that the one or more proximity sensors (123) are not working properly and that the indication that the electronic device (100) is in the stowed state, received at decision 502, is invalid. Accordingly, the method 500 proceeds to step 505. In one or more embodiments, step 506 comprises performing the control operation in response to the one or more other sensors, e.g., the one or both of the front-facing camera or imager (103) and/or the rear-facing camera or imager (104) in this example, failing to indicate that the electronic device (100) is in the stowed state.

In other embodiments, the one or more processors (112) query one or both of the front-facing camera or imager (103) and/or the rear-facing camera or imager (104) to determine if the user (406) is staring at the electronic device (100). Where the user (406) is staring at the electronic device (100), in one or more embodiments the one or more processors (112) conclude that the one or more proximity sensors (123) are not working properly and that the indication that the electronic device (100) is in the stowed state, received at decision 502, is invalid. Accordingly, the method 500 proceeds to step 505, which again comprises performing the control operation in response to the one or more other sensors, e.g., the one or both of the front-facing camera or imager (103) and/or the rear-facing camera or imager (104) in this example, failing to indicate that the electronic device (100) is in the stowed state.

In still other embodiments, the one or more processors (112) can query the distance measurement sensor (208) to determine distances between the electronic device and other objects. If the distance is not within a predefined distance threshold, such as one or two inches, the one or more processors (112) conclude that the one or more proximity sensors (123) are not working properly and that the indication that the electronic device (100) is in the stowed state, received at decision 502, is invalid. Accordingly, the method 500 proceeds to step 505, which again comprises performance of the control operation in response to the one or more other sensors, e.g., the distance measurement sensor (208) in this example, failing to indicate that the electronic device (100) is in the stowed state. Other techniques for the one or more other sensors indicating that the electronic device (100) is not in the stowed state will be obvious to those of ordinary skill in the art having the benefit of this disclosure.

Accordingly, in one or more embodiments the method 500 illustrated in FIG. 5, when applied to the electronic device (100) of FIG. 1, results in a user interface (111) receiving user input requesting performance of a control operation at step 501. In one or more embodiments, this user input comprises gesture input. In one or more embodiments, the gesture input moves the electronic device (100) in three-dimensional space.

In one or more embodiments, a first sensor, e.g., the one or more proximity sensors (123), delivers a first signal to one or more processors (112) of the electronic device indicating that the electronic device (100) is in a stowed state at decision 502. In one or more embodiments, step 501 and decision 502 occur simultaneously. Said differently, in one or more embodiments the gesture input received at step 501 occurs while the one or more proximity sensors (123) re delivering the first signal indicating that the electronic device (100) is in the stowed state.

Thereafter, a second sensor, e.g., a touch sensor (118), delivers a second signal to the one or more processors indicating that the electronic device (100) is in a held state at decision 503. When such a conflict occurs, in one or more embodiments the one or more processors (112) query a third sensor at decision 504. The third sensor could be one or more of the front-facing camera or imager (103), the rear-facing camera or imager (104), the distance measurement sensor (208), which can be one or more of the time of flight depth imager (209), the radar device (210), the sonar device (211), the ultrasound distance measurement device (212), or another distance measurement device, the light sensor (202), the one or more motion sensors (205), or any of the other sensors (119) of the electronic device (100).

In one or more embodiments, the one or more processors (112) query the third sensor for a third signal indicating whether the electronic device (100) is in the stowed state. Where the third signal fails to indicate the electronic device (100) is in the stowed state, in one or more embodiments the one or more processors (112) perform the control operation at step 505. However, the one or more processors (112) omit performance of the control operation at step 506 when the third signal indicates that the electronic device (100) is in the stowed state in one or more embodiments.

Figure 6:
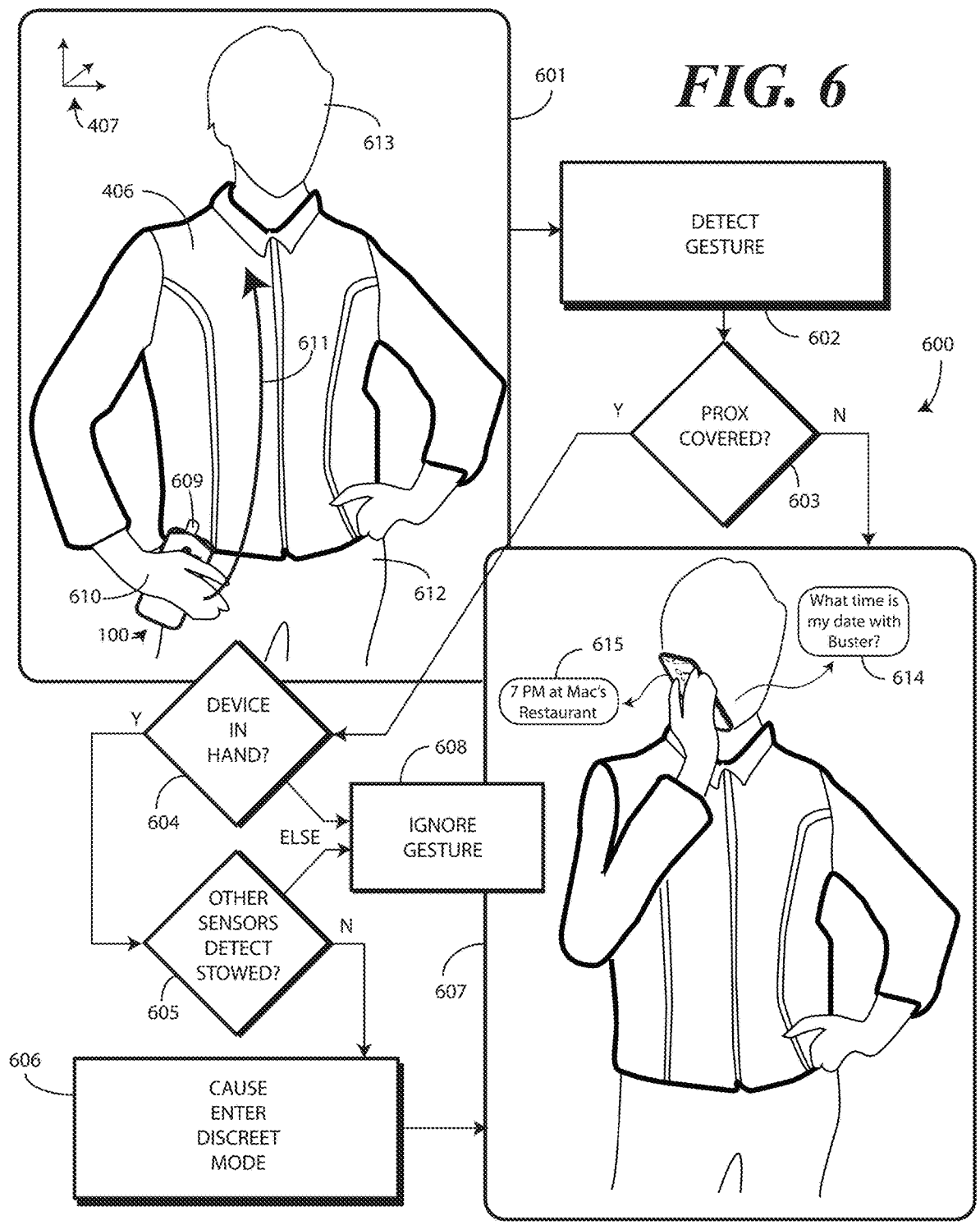
FIG. 6 illustrates still another explanatory method in accordance with one or more embodiments of the disclosure.

These steps are illustrated by a more tangible example in FIG. 6. Turning now to FIG. 6, illustrated therein is another explanatory method 600 in accordance with one or more embodiments of the disclosure. The method 600 of FIG. 6 illustrates one or more steps of using an electronic device 100 in accordance with one or more embodiments of the disclosure.

Beginning at step 601, a user 406 is shown holding the electronic device 100. As shown at step 601, the user's thumb 609 is inadvertently covering the proximity sensor (123) that is centrally located along the front surface of the electronic device 100. This covering of the proximity sensor (123) by the thumb causes the proximity sensor (123) to deliver signals to the one or more processors (112) of the electronic device indicating that the electronic device 100 is in a stowed state. However, as shown at step 601, the electronic device 100 is actually in a held state due to the fact that the user 406 is holding the electronic device 100 in her hand 610.

In this illustrative example, the electronic device 100 is operating in a default mode of operation at step 601. In this example, the default mode of operation comprises a first mode of operation where the audio processor (116) is operative to receive a speech command from a first distance and produce, in response to the speech command, an audible output at a first output level. Thus, the user 406 could deliver, in a normal conversational tone, a voice command asking, "How tall is the Sears Tower?" with audio output (110) of the electronic device 100 announcing the answer with an audible output that the user 406 could hear several feet away.

However, in FIG. 6, the user 406 is interested in receiving personal information that she does not want third parties to hear. Additionally, she does not want third parties to see her manipulating her device to place it in a privacy mode, as this "tip" may pique the curiosity of these third parties, thereby making them want to "listen in" even more closely. Advantageously, embodiments of the disclosure allow the user 406 to make a simple gesture to cause the one or more processors (112) of the electronic device 100 to toggle modes of operation.

Accordingly, at step 601 the user delivers a predefined user input 611 requesting the one or more processors (112) to perform a control operation by raising the electronic device 100 from her waist 612 to her head 613. Accordingly, the predefined user input 611 of this explanatory step 601 comprises lifting the electronic device 100 from a first elevation (the hip) to a second elevation (the head) in three-dimensional space 407. In this illustration, the second elevation is greater than the first elevation. The gesture can be detected in several ways, including by using a motion sensor (205), a barometer, or other sensor (119). Other techniques for detecting the gesture were described above. Still others will be obvious to those of ordinary skill in the art having the benefit of this disclosure.

At step 602, the one or more processors (112) of the electronic device 100 detect the user input 611 as previously described. As noted above, in this example the user's thumb 609 is inadvertently covering the proximity sensor (123) that is centrally located along the front surface of the electronic device 100. This covering of the proximity sensor (123) by the thumb causes the proximity sensor (123) to deliver signals to the one or more processors (112) of the electronic device indicating that the electronic device 100 is in a stowed state. Thus, at decision 603 the proximity sensor (123) indicates the electronic device 100 is in a stowed state, despite the fact that it is actually in the held state of step 601.

In one or more embodiments, step 602 and the receipt of the signals at decision 603 occur simultaneously. Thus, in one or more embodiments step 602 comprises the one or more processors (112) detecting, with the user interface (111) of the electronic device 100, the user input 611 requesting the one or more processors (112) to perform a control operation while, at decision 603, the proximity sensor (123) indicates the electronic device 100 is in the stowed state. In other embodiments, step 602 and decision 603 occur sequentially, with step 602 preceding decision 603.

Had the user 406 not had the proximity sensor (123) covered with her thumb 609, the proximity sensor (123) would not indicate the electronic device 100 is in the stowed state. The method 600 would thus move to step 607 where the control operation is performed. However, in this example the placement of the user's thumb 609 causes the proximity sensor (123) to indicate the electronic device 100 is in the stowed state. Thus, the method 600 moves to decision 604.

At decision 604, the one or more processors determine whether a touch sensor (118) indicates the electronic device 100 is in a held state or a stowed state. In one or more embodiments, this decision 604 occurs in response to decision 603 indicating that the electronic device 100 is in a stowed state. Since the user's hand 610 is grasping the housing 102 of the electronic device 100, in this example the touch sensor (118) delivers signals to the one or more processors (112) of the electronic device indicating that the electronic device 100 is in a held state.

Had the touch sensor (118) not indicated that the electronic device 100 was being touched at decision 604, the method 600 would move to step 608 where the one or more processors (112) have verified that the proximity sensor (123) is correct, i.e., that the electronic device 100 is indeed in a stowed state due to the fact that it is not being held. At step 608, the one or more processors (112) would omit performing any control operation in response to the user input 611 due to the fact that the electronic device 100 is stowed.

However, in this embodiment the electronic device 100 is indeed being held. Accordingly, the method 600 moves to decision 605 where the one or more processors (112) determine, with at least one other sensor, which would be a third sensor in this scenario, whether this third sensor indicates via signals delivered to the one or more processors (112) whether the electronic device 100 is in the stowed state. Said differently, in one or more embodiments decision 605 comprises the one or more processors (112) querying a third sensor for a third signal indicating whether the electronic device 100 is in a stowed state or a held state.

Figure 7:
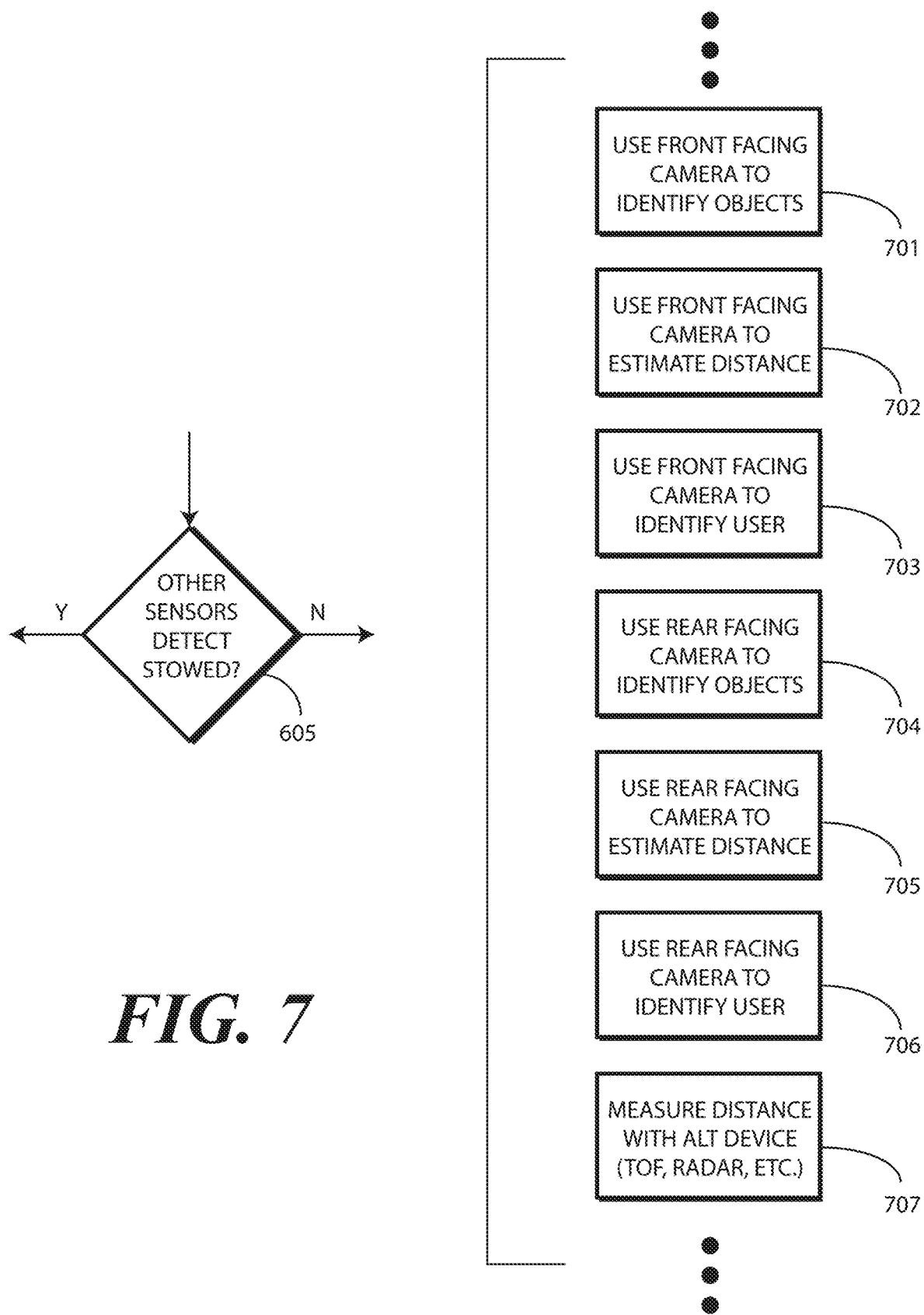
FIG. 7 illustrates one or more explanatory method steps in accordance with one or more embodiments of the disclosure.

As noted above, this can occur in a variety of ways. Turning briefly to FIG. 7, illustrated therein are a few examples, some of which were previously described with reference to FIG. 5. In one or more embodiments, decision 605 comprises, at step 701, capturing one or more images with a front-facing camera or imager (103) of an environment (117) of the electronic device (100) to determine whether the electronic device (100) is in an enclosed condition. For example, the front-facing camera or imager (103) can capture one or more images of the environment (117) that allow the one or more processors (112) to perform image analysis to determine if these objects can be identified. If the one or more processors (112) identify depictions of textile materials, cardboard, wood, or metal, without detecting any depictions of people, the one or more processors (112) may conclude that the electronic device (100) is in an enclosed condition at step 701.

Alternatively, if the front-facing camera or imager (103) is incapable of capturing identifiable objects in the images due to low-light or dark conditions, the one or more processors (112) may conclude that the electronic device (100) is in an enclosed condition. If objects captured in the images taken by the front-facing camera or imager (103) are out of focus or otherwise distorted due to being to close to the front-facing camera or imager (103), the one or more processors (112) may also conclude the electronic device (100) is in an enclosed condition. The rear-facing camera or imager (104) can be used in similar fashion at step 704. Of course, steps 701 and 704 can occur concurrently, with the front-facing camera or imager (103) and rear-facing camera or imager (104) both capturing images to determine whether the electronic device (100) is in an enclosed condition.

In one or more embodiments, decision 605 comprises, at step 702, using the front-facing camera or imager (103) to detect distances between the electronic device (100) and surrounding objects. Said differently, in one or more embodiments step 702 comprises determining one or more distances between one or more objects and the electronic device (100).

Illustrating by example, the one or more processors (112) can perform image analysis on the images captured by the front-facing camera or imager (103) to estimate distances as a function of the focal length and aperture settings of the front-facing camera or imager (103). If a person's entire head fits within the frame captured by the front-facing camera or imager (103), the one or more processors (112) may conclude that the person is farther from the electronic device (100) than, for instance, when only a portion of the person's face is captured within the frame, and so forth. Similarly, if a known object of a certain size is identified in one or more images captured by the front-facing camera or imager (103), the size of other objects captured in the images can be compared to determine distance between each object. If a golf ball fills forty percent of the frame, while a person fills only ten, the one or more processors (112) may conclude that the person is farther from the electronic device (100) than the golf ball. The rear-facing camera or imager (104) can be used in similar fashion at step 705. Of course, steps 702 and 705 can occur concurrently, with the front-facing camera or imager (103) and rear-facing camera or imager (104) both capturing images for the purpose of determining one or more distances between one or more objects and the electronic device (100) as well.

In one or more embodiments, decision 605 comprises, at step 703, using the front-facing camera or imager (103) to attempt to identify one or more persons depicted in images captured by the front-facing camera or imager (103). For example, the one or more processors (112) can be configured to process images captured by the front-facing camera or imager (103) of an object and determine whether the object matches predetermined criteria by comparing the image to one or more predefined authentication references stored in memory (113). In one or more embodiments the imager processor system (120) can operate as an authentication module configured with optical recognition to identify objects using image recognition, character recognition, visible recognition, facial recognition, color recognition, shape recognition, and the like. Advantageously, the imager processor system (120) can be used as a facial recognition device to determine the identity of one or more persons detected within an environment about the electronic device 100. The rear-facing camera or imager (104) can be used in similar fashion at step 706. Of course, steps 703 and 706 can occur concurrently, with the front-facing camera or imager (103) and rear-facing camera or imager (104) both capturing images to in an effort to identify one or more persons about the electronic device (100).

In one or more embodiments, decision 605 comprises, at step 707, using a distance measurement sensor (208) to determine distances between objects situated within the environment (117) and the electronic device (100). The distance measurement sensor (208), which can be one or more of the time of flight depth imager (209), the radar device (210), the sonar device (211), the ultrasound distance measurement device (212), or another distance measurement device, is operable to determine distances between the electronic device and other objects in one or more embodiments. If the distance is within a predefined distance threshold, such as one or two inches, the one or more processors (112) conclude that the electronic device (100) is in the stowed state. Of course, the various steps of FIG. 7 can be used alone or in combination.

Turning now back to FIG. 6, when the at least one other sensor indicates that the electronic device 100 is in the stowed state at decision 605, in one or more embodiments the method 600 moves to step 608 the one or more processors (112) would omit performing any control operation in response to the user input 611 due to the fact that the electronic device 100 is stowed. However, in this embodiment the electronic device 100 is indeed being held. Accordingly, the at least one other sensor fails to indicate that the electronic device 100 is in the stowed state at decision 605. The method 600 then moves to step 606 where the one or more processors (112) perform the control operation in response to the user input 611.

In this illustration, the one or more processors (112) cause the audio processor (116) to transition to a second mode. As shown at step 607, in the second mode the audio processor (116) is operative to receive a speech command 614 from a second distance and produce, in response to the speech command, the audible output 615 at a second output level. Here, the user 406 is asking, "What time is my date with Buster?" The audible output 615, which no eavesdroppers can hear due to its lower volume, says, "Seven PM at Mac's Restaurant." Thus, in response to the gesture received at step 601, and after the touch sensor (118) confirms the user 406 is touching the electronic device 100, and at least a third sensor fails to indicate that the electronic device 100 is in the stowed state, the one or more processors (112) transition the electronic device 100 from a normal mode of operation to a discrete mode of operation in this example.

Figure 8:
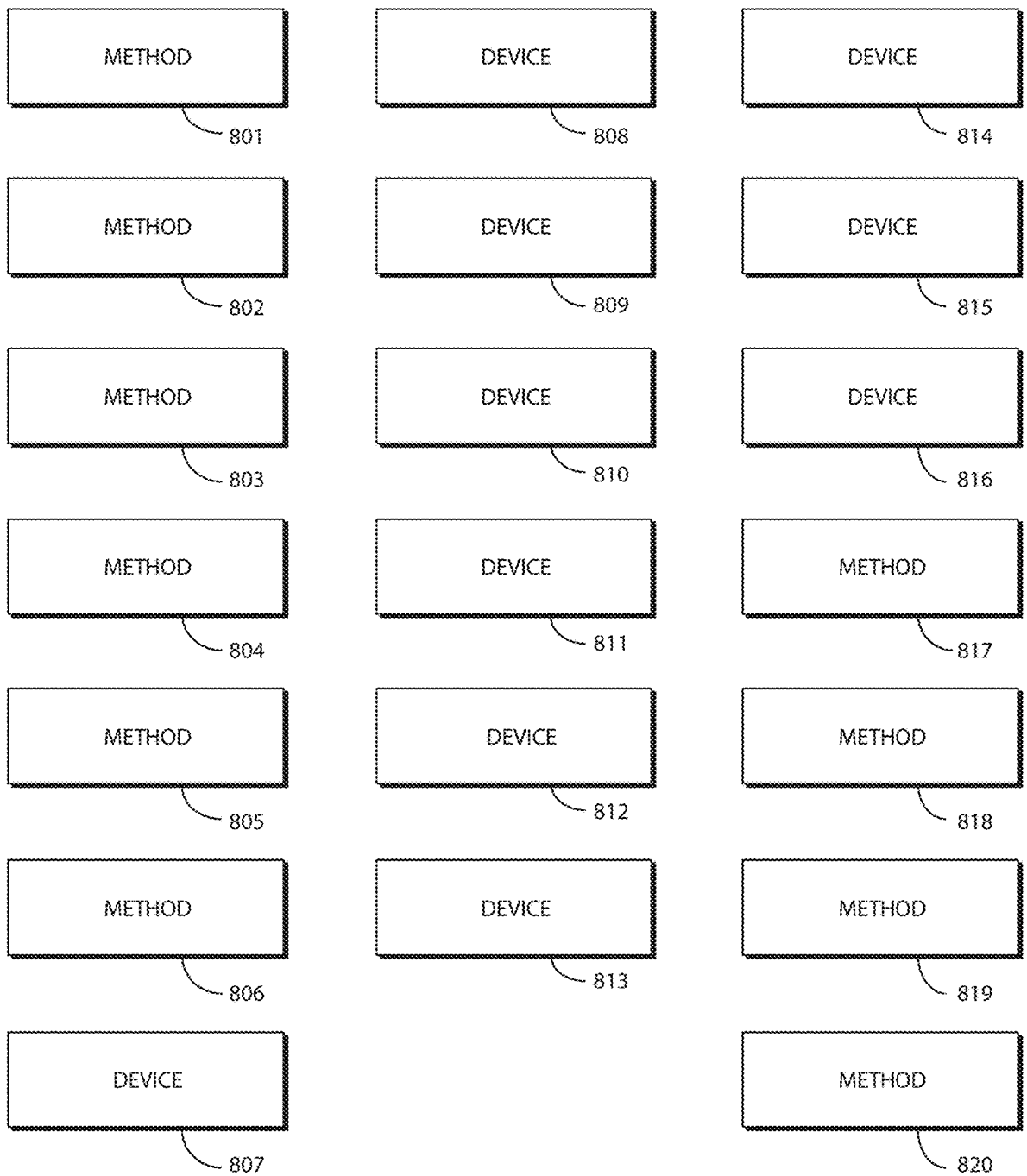
FIG. 8 illustrates one or more embodiments of the disclosure.

Turning now to FIG. 8, illustrated therein are various embodiments of the disclosure. At 801, a method in an electronic device comprises receiving, by one or more processors from at least one proximity sensor, an indication that the electronic device is in a stowed state. At 801, the method comprises determining, by the one or more processors with one or more sensors in response to receiving the indication, whether the one or more sensors indicate that the electronic device is in a held state.

At 801, the method also includes determining, by the one or more processors with one or more other sensors in response to the one or more sensors indicating that the electronic device is in a held state, whether the one or more other sensors indicate that the electronic device is in the stowed state. At 801 the method includes performing, by the one or more processors, a control operation in response to the one or more other sensors failing to indicate that the electronic device is in the stowed state.

At 802, the method of 801 comprises receiving, at a user interface, user input requesting performance of the control operation. At 803, the user input of 802 comprises gesture input translating the electronic device in three-dimensional space. At 804, the receipt of the user input at 803 occurs during receipt of the indication that the electronic device is in the stowed state.

At 805, the method of 802 further comprises omitting performance of the control operation in response to the one or more other sensors indicating that the electronic device is in the stowed state. At 806, the method of 802 further comprises omitting performance of the control operation in response to the one or more sensors failing to indicate that the electronic device is in the held state.

At 807, an electronic device comprises one or more processors. At 807, a first sensor delivers a first signal to the one or more processors indicating that the electronic device is in a stowed state. At 807, a second sensor delivers a second signal to the one or more processors indicating that the electronic device is in a held state.

At 807, the electronic device also comprises a third sensor. At 807, the one or more processors query, in response to the first signal and the second signal, the third sensor for a third signal indicating whether the electronic device is in the stowed state. At 807, the one or more processors perform a control operation when the third signal fails to indicate the electronic device is in the stowed state.

At 808, the electronic device of 807 further comprises a user interface receiving user input requesting performance of the control operation prior to the one or more processors querying the third sensor. At 809, the user input of 808 comprises gesture input received while the first sensor delivers the first signal to the one or more processors. At 810, the gesture input of 809 moves the electronic device in three-dimensional space.

At 811, the first sensor of 808 comprises a proximity sensor. At 812, the second sensor of 811 comprises a touch sensor. At 813, the third sensor of 812 comprises an imager. At 814, the third sensor of 812 comprises a depth imager. At 815, the third sensor of 812 comprises a distance measurement sensor. At 816, the one or more processors of 808 omit performance of the control operation when the third signal indicates the electronic device is in the stowed state.

At 817, a method in an electronic device comprises detecting, with a user interface, user input requesting one or more processors to perform a control operation while at least one proximity sensor indicates the electronic device is in a stowed state. At 817, the method comprises determining, by the one or more processors, whether a touch sensor indicates the electronic device is in a held state in response to the detecting.

At 817, the method comprises determining, by the one or more processors, whether at least one other sensor indicates the electronic device is in the stowed state. At 817, the method comprises omitting performance of the control operation in response to the at least one other sensor indicating the electronic device is in the stowed state.

At 818, the method of 817 further comprises performing the control operation in response to the at least one other sensor failing to indicate the electronic device is in the stowed state. At 819, the determining whether the at least one other sensor indicates the electronic device is in the stowed state of 818 comprises capturing one or more images of an environment of the electronic device to determine whether the electronic device is in an enclosed condition. At 820, the determining whether the at least one other sensor indicates the electronic device is in the stowed state of 818 comprises determining one or more distances between one or more objects and the electronic device.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device, the method comprising:
    determining, by one or more processors with one or more sensors, whether the one or more sensors indicate that the electronic device is in a held state; and
    determining, by the one or more processors with one or more other sensors in response to the one or more sensors indicating that the electronic device is in a held state, whether the one or more other sensors indicate that the electronic device is in a stowed state; and
    performing, by the one or more processors, a control operation in response to the one or more other sensors failing to indicate that the electronic device is in the stowed state.

2. The method of claim 1, further comprising receiving, at a user interface, user input requesting performance of the control operation.

3. The method of claim 2, the user input comprising gesture input translating the electronic device in three-dimensional space.

4. The method of claim 3, wherein receipt of the user input occurs during receipt of the indication that the electronic device is in the stowed state.

5. The method of claim 2, further comprising omitting performance of the control operation in response to the one or more other sensors indicating that the electronic device is in the stowed state.

6. The method of claim 2, further comprising omitting performance of the control operation in response to the one or more sensors failing to indicate that the electronic device is in the held state.

7. An electronic device, comprising:
    one or more processors;
    a first sensor delivering a first signal to the one or more processors indicating that the electronic device is in a held state; and
    a second sensor;
    the one or more processors querying, in response to the first signal, the second sensor for a second signal indicating whether the electronic device is in a stowed state, and performing a control operation when the second signal fails to indicate the electronic device is in the stowed state.

8. The electronic device of claim 7, further comprising a user interface receiving user input requesting performance of the control operation prior to the one or more processors querying the second sensor.

9. The electronic device of claim 8, the user input comprising gesture input received while the first sensor delivers the first signal to the one or more processors.

10. The electronic device of claim 9, the gesture input moving the electronic device in three-dimensional space.

11. The electronic device of claim 8, the first sensor comprising a touch sensor.

12. The electronic device of claim 11, the second sensor comprising an imager.

13. The electronic device of claim 11, the second sensor comprising a depth imager.

14. The electronic device of claim 11, the second sensor comprising a distance measurement sensor.

15. The electronic device of claim 11, the second sensor comprising a proximity sensor.

16. The electronic device of claim 8, the one or more processors omitting performance of the control operation when the third signal indicates the electronic device is in the stowed state.

17. A method in an electronic device, the method comprising:
    detecting, with a user interface, user input requesting one or more processors to perform a control operation while the electronic device is in a stowed state;
    determining, by the one or more processors, whether the electronic device is in a held state in response to the detecting;
    confirming, by the one or more processors, whether the electronic device is in the stowed state; and
    omitting performance of the control operation in response to confirming the electronic device is in the stowed state.

18. The method of claim 17, further comprising performing the control operation in response to failing to confirm the electronic device is in the stowed state.

19. The method of claim 18, the determining whether the electronic device is in the stowed state comprising capturing one or more images of an environment of the electronic device to determine whether the electronic device is in an enclosed condition.

20. The method of claim 18, the determining whether the electronic device is in the stowed state comprising determining one or more distances between one or more objects and the electronic device.

* * * * *